United States Patent Office 3,277,113
Patented Oct. 4, 1966

3,277,113
(THIO)-PHOSPHORIC, -PHOSPHONIC, AND -PHOSPHINIC ACID ESTERS OF 4-HYDROXY PHTHALIMIDE DERIVATIVES
Karl Mannes, Cologne-Stammheim, and Günter Unterstenhöfer, Opladen, Germany, assignors to Farbenfabriken Bayer Aktiengesellschaft, Leverkusen, Germany, a German corporation
No Drawing. Filed Jan. 6, 1964, Ser. No. 336,023
Claims priority, application Germany, Jan. 5, 1963, F 38,714
10 Claims. (Cl. 260—326)

The present invention relates to and has as its objects new and useful pesticidally, especially insecticidally active phosphorus containing compounds.

More specifically the objects of this invention are phosphoric, phosphonic, phosphinic and thionophosphoric, -phosphonic, -phosphinic acid esters of the general formula

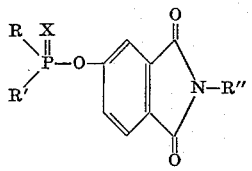

as well as a process for the production of such compounds.

In the above formula R and R' stand for the same or different, possibly substituted and/or branched and/or unsaturated alkyl radicals which may be linked with the phosphorus atom directly or via a sulphur or oxygen atom. R and R' further denote possibly substituted aryl or aralkyl radicals as well as groups of the general formula

wherein $R_1$ and $R_2$ represent hydrogen atoms, alkyl or cycloalkyl groups, or together with the nitrogen atom form a heterocyclic ring which may be interrupted by further oxygen, sulphur or nitrogen atoms.

R'' stands for hydrogen or a straight-chain or branched, possibly substituted and/or unsaturated alkyl, alkoxy or alkylmercapto radical and X is an oxygen or sulfur atom.

The radicals R and R' preferably denote alkyl, alkenyl, alkoxy or alkylmercapto groups with 1 to 4 carbon atoms, for example methyl, ethyl, isobutenyl, chloromethyl, ethoxyvinyl, methylmercaptovinyl, methoxy, ethoxy, isopropoxy, n-butoxy, 2-chlorethoxy and/or ethylmercapto groups. The said radicals further stand for benzyl, 4-chlorophenylmethyl, phenyl, chlorophenyl, nitrophenyl, methylphenyl, methylmercaptophenyl radicals as well as for amino, alkylamino and dialkylamino groups, such as e.g. methyl-, ethyl- and cyclohexylamino groups, or for piperidine or morpholine radicals.

R'' denotes, besides hydrogen, especially a methyl, ethyl, isopropyl, butyl, allyl, 2-haloally or a methoxy, ethoxy, isopropoxy or trichloromethylmercapto radical.

In accordance with the present invention it has now been found that (thiono)phosphoric (-phosphonic, -phosphinic) acid esters of the above composition are obtained by reacting hydroxy-phthalimides of the general formula

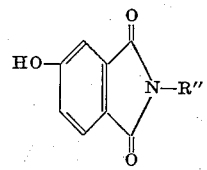

with phosphoric, phosphonic, phosphinic or thiono-phosphoric, -phosphonic, -phosphinic acid ester mono-halides of the formula

In the last-mentioned formulae the symbols, R, R', R'' and X have the same significance as given above, whilst Hal stands for a halogen atom.

The reaction according to the invention is preferably carried out in the presence of acid-binding agents. Alkali metal alcoholates and carbonates, but also tertiary amines, such as triethylamine, dimethyl aniline or pyridine, are chiefly suitable for this purpose. However, it is equally possible to prepare first the salts, preferably alkali metal or ammonium salts, of the above-mentioned hydroxy-phthalimides in substance, and to react them subsequently according to the present invention with the corresponding (thiono)phosphoric (-phosphonic, -phosphinic) acid ester halides.

It has further proved to be advantageous to carry out the process of the invention at slightly to moderately elevated temperatures and in the presence of inert organic solvents. Low-boiling alcohols, ketones and nitriles (e.g. methanol, ethanol, propanol, acetone, methyl ethylketone, methyl isopropylketone, methylisobutyl-ketone, acetonitrile and propionitrile) and aliphatic or aromatic hydrocarbons which may be chlorinated, such as methylene chloride, chloroform, carbon tetrachloride, benzene, chlorobenzene, toluene, xylene and the like, and also dimethyl formamide, have been found to be eminently suitable for the aforesaid purpose.

The hydroxy-phthalimides required as starting materials for the process according to the invention are described in the literature and can be produced by known methods.

Some of the (thiono)phosphoric (-phosphonic, -phosphinic) acid esters obtained according to the present invention result in the form of readily crystallising substances with a sharp melting point, and can easily be further purified by recrystallisation from the customary solvents; some of the products, however, are viscous oils which cannot be distilled without decomposition even under strongly reduced pressure.

They are distinguished by excellent pesticidal, especially insecticidal properties and are therefore used as pest control agents, mainly for plant protection.

The new compounds of the present invention very effectively kill insects like aphids, spider mites, caterpillars, flies, ticks, etc. They distinguish themselves especially by a good contact-insecticidal activity and mostly also by a systemic and ovicidal action. At the same time they have an activity on eating insects such as caterpillars. Most surprisingly they are of remarkably low toxicity against warm-blooded animals. They may be used in the same manner as other known phosphoric insecticides, i.e. in a concentration from about 0.00001% to about 1%, diluted or extended with suitable solid or liquid carriers or diluents in the form of suspensions, dispersions, powders and dusts. Examples of solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae (I) 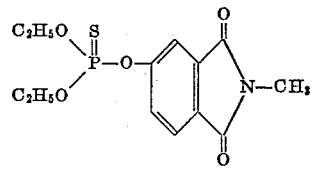

(II) 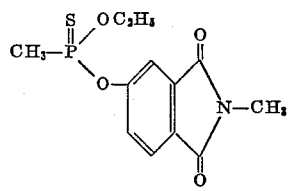

(III) 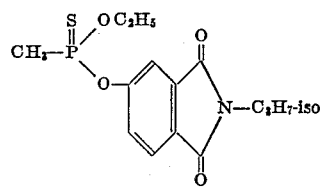

have been tested against aphids and spider mites.

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate (in percent) |
| --- | --- | --- |
| I | 0,01 | 100 |
| II | 0,01 | 100 |
| III | 0.001 | 80 |

(b) against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
| --- | --- | --- |
| I | 0.01 | 100 |
| II | 0.01 | 100 |
| III | 0.001 | 100 |

The following examples are given for the purpose of illustrating the invention in more detail, but without limiting it in any way.

*Example 1*

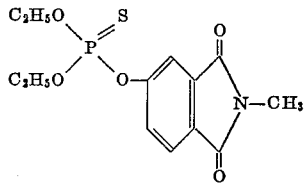

17.7 g. (0.1 mol) of 4-hydroxy-phthalic acid-N-methylimide and 16.8 g. of anhydrous potassium carbonate are stirred in 100 ml. of methyl ethyl ketone at 60° C. for one hour, and 20 g. of 90% O,O-diethyl-thionophosphoric acid ester chloride are subsequently added dropwise at 50° C. to the reaction mixture which is then further stirred at 50 to 60° C. for one to two hours. After cooling of the mixture, the solid portions are filtered off with suction, the filtrate is diluted with benzene and washed first with water then with a 0.5 N sodium hydroxide solution and finally again with water. After drying the organic phase over sodium sulphate, the solvent is evaporated in a vacuum. The residue solidifies immediately in crystalline form. The yield of crude product amounts to 29 g. corresponding to 88.2% of the theoretical. After recrystallisation from 120 ml. of propanol, the O,O-diethyl - thionophosphoric acid-O-[N-methylimidophthalyl-(4)] ester melts at 78 to 79° C.

*Analysis.*—Calculated: P, 9.43%; S, 9.73%; N, 4.26%. Found: P, 9.40%; S, 9.75%; N, 4.41%, 4.24%.

Aphids and spider mites are killed to 100% by 0.01% solutions of the compound, and the eggs of *Ceratitis capitata* are still destroyed to 100% by 0.0008% solutions of the active substance.

*Example 2*

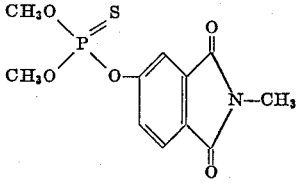

17.7 g. (0.1 mol) of 4-hydroxy-phthalic acid-N-methylimide and 16.8 g. of anhydrous potassium carbonate are reacted in 100 ml. of methyl ethyl ketone with 16.4 g. of O,O-dimethylthionophosphoric acid ester chloride, in the same way as described in Example 1. 24.3 g., corresponding to 80.7% of the theoretical, of O,O-dimethylthionophosphoric acid-O-[N-methylimido - phthalyl-(4)] ester are obtained in the form of a crystalline product which, after recrystallisation from n-propanol, melts at 63 to 64° C.

*Analysis.*—Calculated: P, 10.3%; S, 10.63%; N, 4.65%. Found: P, 10.3%; S, 10.5%; N, 4.55%, 4.84%.

Aphids are destroyed to 100% by 0.01% solutions of the compound. When applied in a concentration of 0.1%, the preparation has a 100% systemic action against aphids.

Example 3

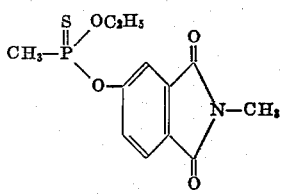

17.7 g. (0.1 mol) of 4-hydroxy-phthalic acid-N-methylimide are reacted with 16.8 g. of potassium carbonate and 16 g. of methyl - O - ethyl-thionophosphonic acid ester chloride in 100 ml. of methyl ethyl ketone as described in Example 1. 27.35 g., i.e., 91.5% of the theoretical of methyl-thionophosphonic acid-O-ethyl-O-[N-methylimido-phthalyl-(4)] ester are obtained which, after recrystallisation from n-propanol, melts at 82 to 83° C.

*Analysis.*—Calculated: P, 10.4%; S, 10.8%; N, 4.74%. Found: P, 10.5%; S, 10.9%; N, 4.74%, 4.77%.

Aphids and spider mites are destroyed to 100% by 0.01% solutions of the ester. When applied in a concentration of 0.1%, the compound has moreover a 100% systemic action.

The following compounds can be produced by the same method:

| Constitution | Physical properties |
|---|---|
| $(CH_3O)_2P(=S)-O-$[phthalimide-N-H] | M.P. 118 to 120° C.<br>Calc.: P, 10.8%; S, 11.18%; N, 4.88%.<br>Found: P, 10.75%; S, 11.1%; N, 4.63%. |
| $(C_2H_5O)_2P(=S)-O-$[phthalimide-N-H] | M.P. 113 to 115° C.<br>Calc.: P, 9.85%; S, 10.16%; N, 4.44%.<br>Found: P, 9.6%; S, 10.4%; N, 4.36%, 4.64%. |
| $CH_3-P(=S)(OC_2H_5)-O-$[phthalimide-N-H] | M.P. 127 to 128° C.<br>Calc.: P, 10.88%; S, 11.23%; N, 4.91%.<br>Found: P, 11.10%; S, 11.40%; N, 4.89%, 5.05%. |
| $(C_2H_5O)_2P(=O)-O-$[phthalimide-N-H] | M.P. 142 to 145° C. |

Example 4

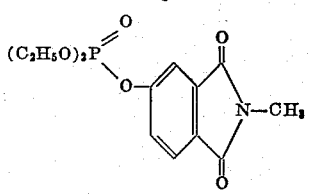

27.2 g. of O,O-diethyl-phosphoric acid ester chloride are added dropwise at 65° C. to a mixture of 26.5 g. of 4-hydroxy-phthalic acid-N-methylimide and 27.2 g. of potassium carbonate in 150 ml. of acetonitrile. The mixture is subsequently further heated at 65 to 70° C. for one hour in order to complete the reaction and, after cooling, poured into ice-water. The separated oil is taken up in benzene and the benzene solution washed with water. After drying the organic phase over sodium sulphate, the solvent is removed under reduced pressure. As residue there are obtained 34 g. (72.5% of the theoretical) of the O,O-diethyl-phosphoric acid-O-[N-methyl-imido-phthalyl-(4)] ester in the form of a brown oil.

*Analysis.*—Calculated: P, 9.9%; N, 4.47%. Found: P, 10.1%; N, 4.30%, 4.46%.

Example 5

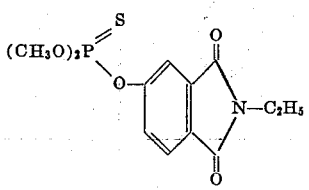

13 g. of 4-hydroxy-phthalic acid-N-ethylimide (M.P. 201 to 202° C.) are reacted in the presence of 10 g. of potassium carbonate in 10 ml. of acetonitrile with 12.1 g. of O,O - dimethyl - thionophosphoric acid ester chloride in the same manner as described in Example 4. The residue obtained after working up the reaction mixture solidifies after some time in crystalline form. After recrystallisation from propanol, the O,O-dimethyl-thionophosphoric acid-O-[N-ethylimidophthalyl-(4)] ester melts at 40 to 41° C.

*Analysis.*—Calculated: P, 9.85%; S, 10.15%; N, 4.45%. Found: P, 9.7%; S, 10.0%; N, 4.42%.

The following compounds can be obtained in an analogous manner:

| Constitution | Yield in percent of the theoretical | Physical properties |
|---|---|---|
| (C$_2$H$_5$O)$_2$P(=S)-O-[phthalimide]-N-C$_2$H$_5$ | 75 | M.P. 72 to 74° C. |
| (C$_3$H$_7$O)$_2$P(=S)-O-[phthalimide]-N-C$_2$H$_5$ | 67.5 | Yellow-brown oil. |

Example 6

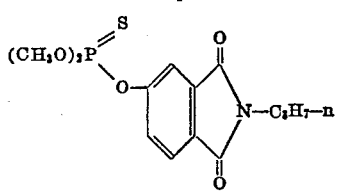

16.4 g. (0.08 mol) of 4-hydroxy-phthalic acid-N-n-propylimide (M.P. 140° C.) and 13.5 g. of potassium carbonate are reacted in methyl ethyl ketone with 13.6 g. of O,O-dimethyl-thionophosphoric acid ester chloride in the same way as described in Example 1. 23 g. of a crystalline product of melting point 42° C. are obtained. By recrystallisation from propanol, the pure O,O-dimethyl-thionophosphoric acid - O - [N-n-propylimido - phthalyl-(4)] ester is obtained. The product then melts at 43 to 43.5° C.

*Analysis.*—Calculated: P, 9.43%; S, 9.73%; N, 4.26%. Found: P, 9.6%; S, 9.9%; N, 4.40%.

The following compounds are likewise obtainable by the same method as described above:

| Constitution | Physical properties |
|---|---|
| (C$_2$H$_5$O)$_2$P(=S)-O-[phthalimide]-N-C$_3$H$_7$-n | M.P. 35° C.<br>Calc.: P, 8.69%; S, 8.98%; N, 3.92%.<br>Found: P, 8.6%; S, 8.9%; N, 3.84%. |

Spider mites are still destroyed to 98% by 0.001% solutions of the product.

| Constitution | Physical properties |
|---|---|
| (C$_2$H$_5$O)$_2$P(=O)-O-[phthalimide]-N-C$_3$H$_7$-n | M.P. 112 to 116° C.<br>Calc.: P, 9.1%; N, 4.13%.<br>Found: P, 9.3%; N, 3.96%. |
| CH$_3$-P(=S)(OC$_2$H$_5$)-O-[phthalimide]-N-C$_3$H$_7$-n | Yellow oil.<br>Calc.: P, 9.56%; S, 9.87%; N, 4.32%.<br>Found: P, 9.8%; S, 9.9%; N, 4.29%; 4.58%. |

Example 7

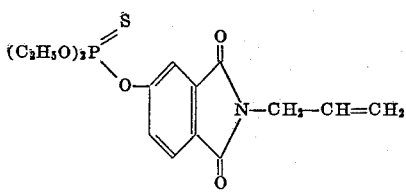

14 g. of 4-hydroxy-phthalic acid-N-allylimide (M.P. 14.3° C.) and 10 g. of potassium carbonate are reacted in 100 ml. of acetonitrile with 14.3 g. of O,O-diethyl-thionophosphoric acid ester chloride, as described in Example 4. 18 g., corresponding to 73.5% of the theoretical, of the O,O-diethyl-thionophosphoric acid-O-[N-allylimido-phthalyl-(4)] ester are obtained in crystalline form (M.P. 54 to 55° C.).

The following compounds can be obtained by the same method:

| Constitution | Yield in percent of the theoretical | Physical properties |
|---|---|---|
| (C₂H₅O)₂P(=O)-O-[phthalimide-N-CH₂-CH=CH₂] | 88.5 | Yellow Oil. Calc. P, 9.15%; N, 4.13%. Found: P, 8.8%; N, 4.03%, 3.98%. |
| (CH₃O)₂P(=S)-O-[phthalimide-N-CH₂-CH=CH₂] | 65.2 | M.P. 35° C. |
| CH₃-P(=S)(OC₂H₅)-O-[phthalimide-N-CH₂-CH=CH₂] | 49.3 | Yellow oil. Calc. P, 9.54%; S, 9.85%; N, 4.32%. Found: P, 9.55%; S, 10.1%; N, 4.30%, 4.60%. |

Example 8

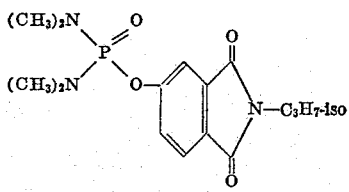

26.8 g. of bis-(N,N-dimethylamido)-phosphoric acid ester chloride are added dropwise at 60 to 65° C. to a mixture of 30.8 g. (0.15 mol) of 4-hydroxy-phthalic acid-N-isopropylimide (M.P. 180° C.) and 27.2 g. of potassium carbonate in 150 ml. of methyl ethyl ketone. The reaction mixture is subsequently stirred at 65 to 70° C. for one hour, poured into water after cooling, and the separated oil is taken up in benzene. The mixture is stirred with kieselguhr for five minutes in order to achieve a better separation of the phases. After filtering, the organic phase is separated, washed with a 0.5 N sodium hydroxide solution and water, the solution is then dried over sodium sulphate and the solvent distilled off in a vacuum. 25 g., corresponding to 49.3% of the theoretical, of the bis-(N,N-dimethylamido)-phosphoric acid-O-[N'-isopropylimidophthalyl-(4)] ester are obtained in the form of a brown oil.

*Analysis.*—Calculated: P, 9.15%; N, 12.4%. Found: P, 8.7%; N, 12.24%, 12.01%.

Example 9

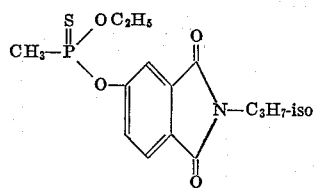

16.4 g. of 4-hydroxy-phthalic acid-N-isopropylimide (M.P. 180° C.) are reacted in the presence of 13.5 g. of potassium carbonate and 0.2 g. of copper powder in 80 ml. of anhydrous methyl ethyl ketone with methyl thionophosphonic acid-O-ethyl ester chloride as described in Example 1. After working up the mixture, 23 g., corresponding to 88% of the theoretical, of the methyl-thionophosphonic acid - O-ethyl-O-[N-isopropylimido-phthalyl-(4)] ester are obtained in the form of a yellow oil.

*Analysis.*—Calculated: P, 9.56%; S, 9.87%; N, 4.32%. Found: P, 9.8%; S, 10.1%; N, 4.35%, 4.65%.

By 0.001% solutions of the product aphids are destroyed to 80%, spider mites even to 100%. The compound moreover possesses an excellent ovicidal action. Eggs of the flour moth are destroyed to 100% by 0.004% solutions. The product exhibits an excellent residual effect against the eggs of the Mediterranean fruitfly.

The following compounds can be obtained by an analogous method:

| Constitution | Yield in percent of theoretical | Physical properties |
|---|---|---|
| 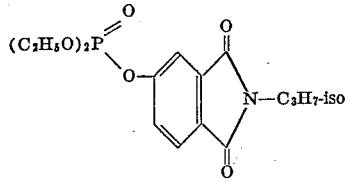 | 89 | Yellow oil. |
| 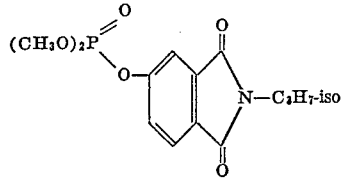 | 85.5 | M.P. 50° C. |
| 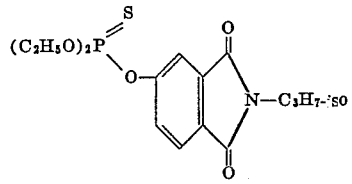 | 88 | Yellow oil. |

Example 10

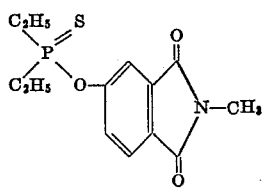

17.7 g. (0.1 mol) of 4-hydroxy-phthalic acid-N-methylimide are reacted as described in Example 5 in the presence of 15.2 g. (0.11 mol) of potassium carbonate in 100 ml. of acetonitrile with 16.4 g. of diethyl-thionophosphinic acid chloride, and 28 g., corresponding to 94.2% of the theoretical, of the diethyl-thionophosphinic acid-O-[N-methylimido-phthalyl-(4)] ester are thus obtained.

Example 11

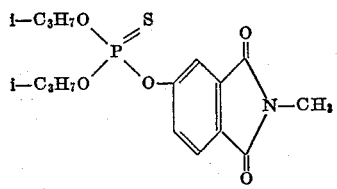

22.8 g. of O,O-diisopropyl-thionophosphoric acid ester chloride are added dropwise at 60 to 65° C. to a mixture of 17.7 g. of 4-hydroxy-phthalic acid-N-methylimide, 15.2 g. of potassium carbonate and 100 ml. of acetone, and the mixture is subsequently stirred at 60 to 70° C. for a further hour. After cooling, the mixture is poured into ice-water, the reaction product which precipitates in crystalline form is filtered off with suction, washed with water and dried. The yield amounts to 32 g., corresponding to 89.7% of the theoretical. The O,O-diisopropyl-thionophosphoric acid - O-[N-methylimido-phthalyl-(4)] ester melts at 54 to 56° C.

The following compound of melting point 59 to 61° C. is obtained in an analogous manner in a yield of 88.8% of the theoretical:

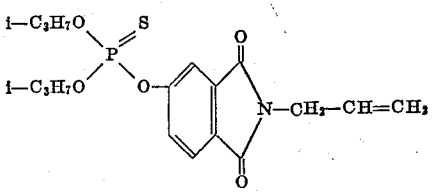

We claim:
1. A compound of the formula

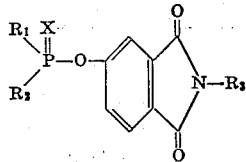

wherein
$R_1$ and $R_2$ stand for members selected from the group consisting of lower alkyl having up to 4 carbon atoms, lower alkoxy having up to 4 carbon atoms and lower dialkylamino wherein the alkyl group is methyl, ethyl or cyclohexyl,
$R_3$ stands for a member selected from the group consisting of hydrogen, lower alkyl having up to 4 carbon atoms and lower alkenyl having up to 4 carbon atoms
and X stands for a member selected from the group consisting of oxygen and sulfur.
2. A compound according to claim 1 wherein $R_1$ and $R_2$ stand for lower alkoxy.
3. A compound according to claim 1 wherein $R_1$ stands for lower alkoxy and $R_2$ stands for lower alkyl.

4. A compound according to claim 1 wherein $R_1$ and $R_2$ stand for lower dialkylamino.

5. A compound according to claim 1 wherein $R_1$ and $R_2$ stand for lower alkyl.

6. The compound of the formula

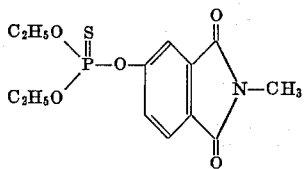

7. The compound of the formula

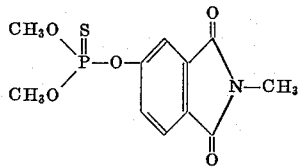

8. The compound of the formula

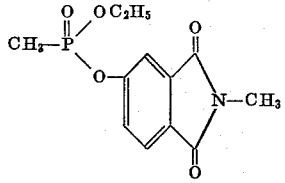

9. The compound of the formula

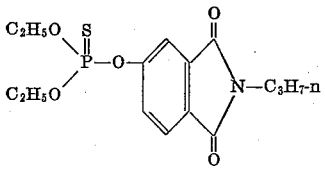

10. The compound of the formula

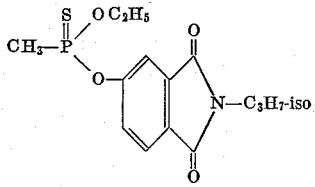

References Cited by the Examiner

UNITED STATES PATENTS 3,150,040  9/1964  Kuramoto et al. __ 260—461.310
3,151,146  9/1964  Schrader et al. ___ 260—461.309

FOREIGN PATENTS 557,308  5/1958  Canada.

ALEX MAZEL, *Primary Examiner.*

HENRY R. JILES, *Examiner.*

MARY U. O'BRIEN, *Assistant Examiner.*